United States Patent
Kotani et al.

(10) Patent No.: US 7,750,503 B2
(45) Date of Patent: Jul. 6, 2010

(54) DIRECT CURRENT STABILIZING POWER SOURCE APPARATUS

(75) Inventors: Yoshiaki Kotani, Saitama (JP); Motohiro Shimizu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 361 days.

(21) Appl. No.: 11/910,215

(22) PCT Filed: Mar. 9, 2006

(86) PCT No.: PCT/JP2006/304601
§ 371 (c)(1),
(2), (4) Date: Sep. 28, 2007

(87) PCT Pub. No.: WO2006/112200
PCT Pub. Date: Oct. 26, 2006

(65) Prior Publication Data
US 2009/0058188 A1 Mar. 5, 2009

(30) Foreign Application Priority Data
Mar. 30, 2005 (JP) ............................. 2005-099619

(51) Int. Cl.
*H02J 7/34* (2006.01)
(52) U.S. Cl. ...................................................... 307/66
(58) Field of Classification Search ............. 307/64–66, 307/43, 70, 83; 700/286, 288
See application file for complete search history.

(56) References Cited

U.S. PATENT DOCUMENTS 4,556,802 A * 12/1985 Harada et al. ................. 307/66
4,564,767 A * 1/1986 Charych ....................... 307/66
5,982,645 A * 11/1999 Levran et al. ................. 363/37

(Continued)

FOREIGN PATENT DOCUMENTS

JP  10-91883 A  4/1998

(Continued)

OTHER PUBLICATIONS

International Search Report of PCT/JP2006/304601, date of mailing May 16, 2006.

(Continued)

*Primary Examiner*—Albert W Paladini
(74) *Attorney, Agent, or Firm*—Westerman, Hattori, Daniels & Adrian, LLP

(57) ABSTRACT

A first primary winding N11 of a transformer 1 is connected with a commercial power source 30 via a transistor Q1, and a second primary winding N22 of the transformer 1 is connected with a backup battery 31 via a transistor Q2. An electric power on the second primary winding N12 is output for a controlling apparatus. When a voltage of the commercial power source 30 is larger than a predetermined value, a backup stopping circuit 10 turns off a LED 9 and stops the transistor Q2. The second primary winding N22 is connected with input terminals 14, 15 as a power source for charging a battery 31. While the transistor Q2 is stopped, an electric power for the battery is output from the second primary winding N22. Since the LED 9 turns on at the time of electric power breakdown, the electric power for the battery is stopped.

3 Claims, 1 Drawing Sheet

U.S. PATENT DOCUMENTS 6,774,507 B1 * 8/2004 Byers et al. .................. 307/64
7,449,798 B2 * 11/2008 Suzuki et al. ................. 307/65

FOREIGN PATENT DOCUMENTS

JP      11-89113 A     3/1999

JP      2002-325448 A     11/2002

OTHER PUBLICATIONS

Translation of International Preliminary Report on Patentability dated Oct. 3, 2007 of International Application No. PCT/JP2006/304601.

* cited by examiner

DIRECT CURRENT STABILIZING POWER SOURCE APPARATUS

BACKGROUND OF THE INVENTION

1. Field of the Invention

The present invention relates to a power source apparatus of a controlling apparatus or the like, and more particularly to a direct current stabilizing power source apparatus having a main electric power source such as a commercial power source and a backup power source thereof.

2. Description of the Related Art

In a direct current stabilizing power source apparatus that is used in a controlling apparatus driven by a commercial power source, a battery backup function is often provided as a backup at the time of electric power breakdown or the like. In providing this backup function, various efforts such as reduction of the number of components are made in order to avoid complication of the circuit construction or scale increase of the circuit accompanying this complication. For example, in a direct current stabilizing power source apparatus of battery backup type disclosed in Japanese Patent Application Laid-Open No. 2002-325448, a pulse transformer is provided in which the first primary winding is connected to a commercial power source, and the second primary winding is connected to a backup battery, where the output voltage taken out from the secondary side is controlled to converge on a target value by periodically driving the switching elements respectively connected to the first and second primary windings. In this direct current stabilizing power source, the construction of the controlling unit is simplified by driving at the same controlling timing the switching elements respectively connected to the two primary windings.

In a conventional direct current stabilizing power source apparatus of battery backup type as disclosed in Japanese Patent Application Laid-Open No. 2002-325448, plural switching elements are driven at the same time, so that the switching loss at the time of normal operation, which is not the time of backup, is large. Also, a circuit construction is adopted in which a diode prevents an electric current from flowing backward into the battery by an electric power induced on the second primary winding while the commercial electric power is input into the first primary winding, so that a circuit for charging this battery must be separately provided.

SUMMARY OF THE INVENTION

An object of the present invention is to provide a direct current stabilizing power source apparatus capable of restraining the switching loss, simplifying the circuit for charging the battery, and the like.

The first characteristic feature of the present invention lies in that a direct current stabilizing power source apparatus includes a transformer having first and second primary windings and at least one secondary winding; a first switching means connected to the first primary winding; a main electric power supplying circuit that connects a main power source to the first primary winding via the first switching means; a second switching means connected to the second primary winding; a backup electric power supplying circuit that connects a backup power source to the second primary winding via the second switching means; and an output circuit that converts an alternating electric current appearing on the secondary winding into direct electric current for output, wherein the main electric power supplying circuit includes a backup stopping circuit that outputs a signal for stopping an operation of the second switching means when a voltage of a main electric power that is input into the main electric power supplying circuit is larger than or equal to a predetermined value.

The second characteristic feature of the present invention lies in that at least two of the secondary windings are provided, where one of the two is connected to the output circuit, and the other of the two is connected to the backup electric power supplying circuit as a power source for charging a battery which is the backup power source.

The third characteristic feature of the present invention lies in that the direct current stabilizing power source apparatus is provided with a charging controlling circuit that permits output from the secondary winding connected as the power source for charging the battery while an operation of the second switching means is prohibited.

The fourth characteristic feature of the present invention lies in that the main power source is a commercial power source, and a power breakdown of the commercial power source is made displayable while the signal that is output from the backup stopping circuit is in an off-state.

According to the present invention having the above-described characteristic features, an operation of the second switching means that controls the voltage of the backup power source is forcibly stopped when the output voltage of the main power source is larger than or equal to a predetermined value, whereby the loss for operating the second switching means can be restrained. Since the electric power from the main power source can be preferentially used, use of the backup power source can be saved, whereby a sufficient backup function can be exhibited at the time of emergency. Also, an inexpensive electric power such as commercial electric power can be preferentially used as the main electric power.

According to the second characteristic feature, the charging of the battery serving as the backup power source from the main power source can be carried out with ease in parallel with the operation of supplying electric power to the controlling apparatus or the like.

According to the third characteristic feature, the battery can be charged with the electric power from the main power source with room and without waste.

According to the fourth characteristic feature, the power breakdown of the commercial power source can be confirmed with ease by a signal corresponding to the stoppage or non-stoppage of the second switching means.

DESCRIPTION OF THE REFERENCE NUMERALS

Figure 1:
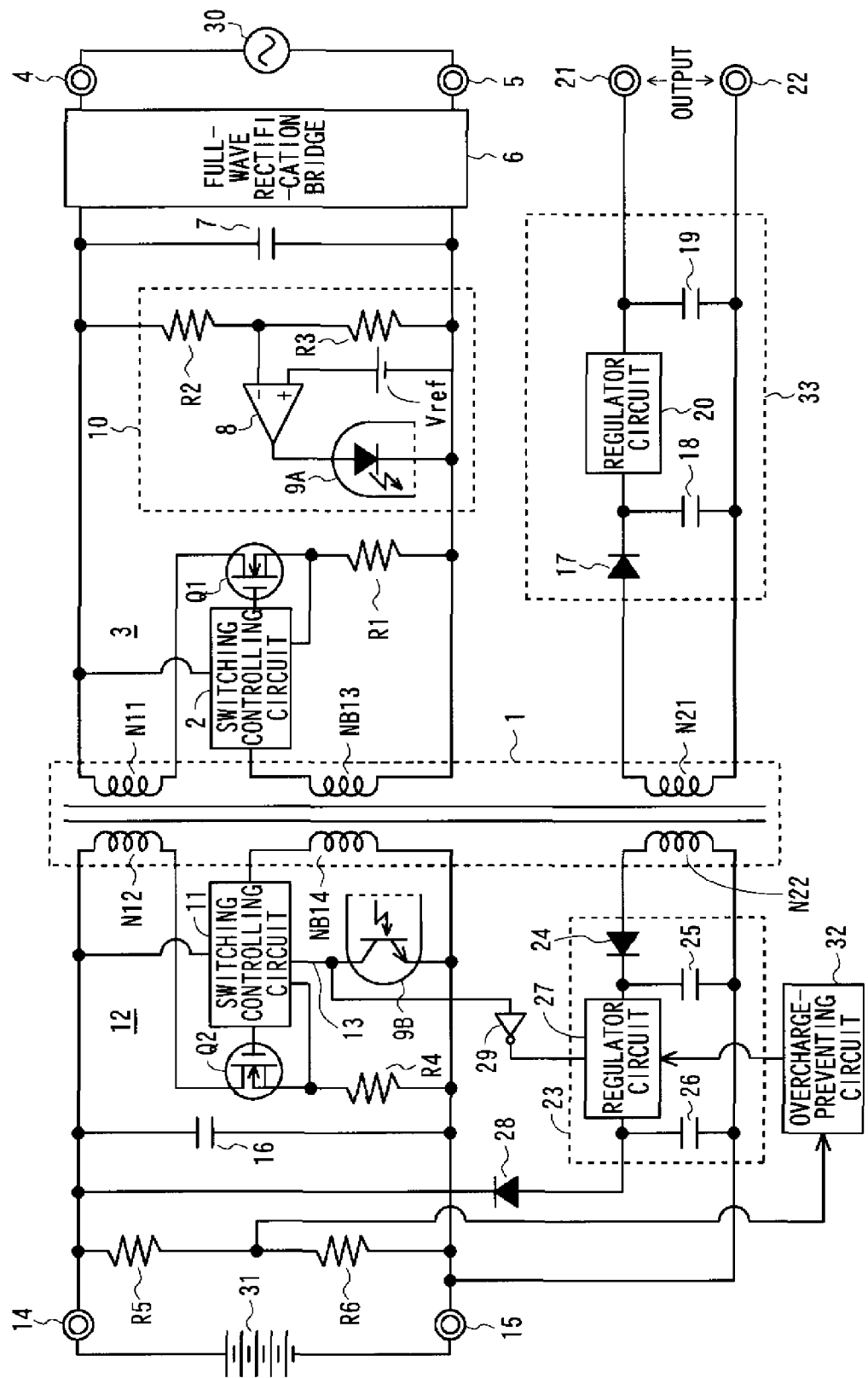
FIG. 1 is a circuit diagram of a direct current stabilizing power source apparatus of battery backup type according to one embodiment of the present invention.

1 . . . transformer, 2, 11 . . . switching controlling circuit, 3, 12 . . . RCC circuit, 8 . . . comparator, 9A . . . light-emitting diode, 9B . . . phototransistor, 10 . . . backup stopping circuit, 20,27 . . . regulator circuit, 29 . . . inverter, 30 . . . commercial electric power system, 31 . . . backup battery

DESCRIPTION OF THE PREFERRED EMBODIMENT

Hereafter, one embodiment of the present invention will be described with reference to the drawings. FIG. 1 is a circuit diagram of a direct current stabilizing power source apparatus of battery backup type according to one embodiment. Here, well-known circuits will be illustrated by being made into a block so as to avoid complexity and cumbersomeness. In FIG. 1, a transformer 1 has a first primary winding N11 and a second primary winding N12 as well as a first feedback winding NB13 and a second feedback winding NB14. Further, the transformer 1 is provided with a first secondary winding N21 and a second secondary winding N22.

The first primary winding N11 and the first feedback winding NB13, together with a transistor Q1 serving as first switching means, a resistor R1, and a switching controlling circuit 2 of the transistor Q1, form a first self-excitation oscillation type converter circuit or a ringing choke converter (RCC circuit) 3.

A commercial electric power system (commercial power source) 30 is connected to the input side of a full-wave rectification bridge 6 via first input terminals 4, 5. The output side of the full-wave rectification bridge 6 is connected to the first RCC circuit 3. To the output side of the full-wave rectification bridge 6, a capacitor 7 for smoothening and resistors R2, R3 are connected respectively in parallel, and a comparator 8 to which the connecting part of the resistors R2, R3 is connected as a negative input is provided. To the positive input of the comparator 8, a reference voltage power source Vref is connected. The output side of the comparator 8 is connected to a negative line via a light-emitting diode 9A. The resistors R2, R3, the comparator 8, the reference voltage power source Vref, and the light-emitting diode 9A form a backup stopping circuit 10.

The second primary winding N12 and the second feedback winding NB14, together with a transistor Q2 serving as second switching means, a resistor R4, and a switching controlling circuit 11 of the transistor Q2, form a second RCC circuit 12. A line 13 is drawn out from the switching controlling circuit 11, and is connected to the negative line via a phototransistor 9B. The switching controlling circuit 11 is constructed so as to be capable of operating when the phototransistor 9B is in an on-state. The line 13 is connected to a regulator circuit 27 via an inverter 29. The regulator circuit 27 is constructed so as to stop operating when the output of the inverter 29 is at a high level. When the phototransistor 9B is on, the output of the inverter 29 is at a high level.

A backup battery 31 is connected to the second RCC circuit 12 via second input terminals 14, 15. Resistors R4, R5 and a capacitor 16 for smoothening are connected between the second input terminals 14, 15.

The first secondary winding N21 is connected to a rectification diode 17, capacitors 18, 19 and a regulator circuit 20 that form an output circuit 33. The output circuit 33 is connected to output terminals 21, 22. The second secondary winding N22 is connected to a rectification diode 24, capacitors 25, 26 and a regulator circuit 27 that form a charging circuit 23 for charging the backup battery 31. Further, the charging circuit 23 has a diode 28 for inhibiting the backward flow of the electric current from the backup battery 31. The output side of the charging circuit 23 is connected to the second input terminals 14, 15. The aforementioned line 13 from the switching controlling circuit 11 is connected to the regulator circuit 27 of the charging circuit 23 via the inverter 29.

The charging circuit 23 is preferably provided with an overcharge-preventing circuit 32 for preventing overcharge of the battery 31. The overcharge-preventing circuit 32 includes a circuit that takes in a voltage representing the battery voltage from the coupling point of the resistors R5, R6 and comparing it with a voltage representing the fully charged voltage. When the battery voltage exceeds a predetermined fully charged voltage, the overcharge-preventing circuit 32 inputs an operation stopping signal into the regulator circuit 27 to stop the charging.

An operation of the above-described backup type direct current stabilizing power source apparatus will be described. First, the case in which an electric power is input only from the commercial electric power system 30 will be described. When the switching controlling circuit 2 of the first transistor Q1 is energized by the input voltage from the commercial electric power system 30 that has passed through the full-wave rectification bridge 6, a voltage is applied to the gate of the first transistor Q1, whereby the first transistor Q1 is turned on. This allows that the input voltage is applied to the first primary winding N11, and a voltage having the same polarity as on the first primary winding N11 is generated on the feedback winding NB13. This voltage is input into the gate of the first transistor Q1 as a feedback signal, whereby the first transistor Q1 maintains its on-state. When a period of time that is determined by the circuit time constants of the switching controlling circuit 2 passes, the gate voltage of the first transistor Q1 will be lowered to zero, and the first transistor Q1 is turned off. When the first transistor Q1 is turned off, a voltage in the forward direction is generated respectively at the diodes 17, 24 on the first and second secondary windings N21, N22 in accordance with the winding ratio to the first primary winding N11. By this, the energy that has been stored in the transformer 1 while the first transistor Q1 is on is released via the first and second secondary windings N21, N22. Namely, the output of the first secondary winding N21 is rectified and smoothened by the diode 17 and the capacitor 18, is adjusted to a predetermined voltage value by the regulator circuit 20, and is further smoothened by the capacitor 19, and is output via the output terminals 21, 22. The output electric power of the output circuit 33 is supplied to a load (not illustrated in the drawings) such as an apparatus for controlling a co-generation system.

As described above, when the energy stored in the transformer 1 is released to the secondary windings N21, N22, a voltage is induced on the primary feedback winding NB13 by back swing. Then, this voltage turns the transistor Q1 on again. In this manner, the switching controlling circuit 2 is constructed to have a circuit such that the winding voltage of the first primary winding N11 will be a predetermined value by switching control of the transistor Q1. A switching controlling circuit constructed so that the winding voltage of the primary winding will be a predetermined value is disclosed, for example, in the specification of Japanese Patent Application Laid-Open No. 2004-201480 or the like, and a well-known construction such as this can be applied as the switching controlling circuits 2, 11.

Further, a voltage is generated also on the second secondary winding N22, and the voltage is rectified and smoothened by the diode 24 and the capacitor 25 and is adjusted to a predetermined charging voltage value by the regulator circuit 27. The output of the regulator circuit 27 is smoothened by the capacitor 26, and is output to the second input terminals 14, 15 via a backward flow inhibiting diode 28. The output electric power of this second secondary winding N22 is supplied for charging the backup battery 31 connected to the second input terminals 14, 15.

When an electric power is being supplied from the commercial electric power system 30, the reference voltage power source Vref is set so that the voltage input into the negative input side of the comparator 8 will be higher than the reference voltage power source Vref. This allows that, when the electric power is not in breakdown, the output of the comparator 8 will be at a low level, and the light-emitting diode 9A does not emit light. Therefore, the phototransistor 9B is maintained to be off, and the operation of the switching controlling circuit 11 is stopped. While the operation of the switching controlling circuit 11 is being stopped, namely, when the phototransistor 9B is off, the voltage input into the regulator circuit 27 from the inverter 29 is at a low level. Namely, the regulator circuit 27 performs normal operation, so that the backup battery 31 is charged with the electric power from the commercial electric power system 30.

On the other hand, when the commercial electric power system 30 is in breakdown or when the commercial electric power system 30 is released from the series, the output of the comparator 8 will be reversed to a high level, so that the light-emitting diode 9A starts emitting light, and the phototransistor 9B is turned on. As a result of this, the stoppage of the operation of the switching controlling circuit 11 is released, and the second RCC circuit 12 starts operating. By the operation of the second RCC circuit 12, a voltage is induced on the first secondary winding N21 and on the second secondary winding N22, whereby the output circuit 33 can output an electric power of a predetermined voltage. Namely, even at the time of occurrence of breakdown or the like, the electric power outputting terminals 21, 22 maintain the output of electric power by the backup battery 31 in the same manner as before the breakdown of electric power.

However, during the operation of the second RCC circuit 12, the output from the inverter 29 to the regulator circuit 27 is changed to a high level, and the operation of the regulator circuit 27 is stopped, so that the charging output to the backup battery 31 is not generated. Namely, during the breakdown of the commercial electric power system 30, the battery charging output will be in a stopped state.

Which of the commercial electric power system 30 and the backup battery 31 is preferentially used when an electric power is input simultaneously from both of the commercial electric power system 30 and the backup battery 31 depends on the setting of the time constants of each circuit. However, no matter which is preferentially used, the phototransistor 9B is turned off as soon as a voltage of a predetermined value or higher is applied from the commercial electric power system 30, so that the output on the secondary side by the electric power from the backup battery 31 will be stopped. Therefore, the backup function by the backup battery 31 works only when the commercial electric power system 30 breaks down, and the backup battery 31 can be charged only by the electric power from the commercial electric power system 30.

As described above, according to the present embodiment, since an electric power of a predetermine voltage or higher is supplied to the primary winding from at least one of the commercial electric power system and the backup battery, a constantly stable electric power can be supplied to a load from the secondary winding. Also, the backup battery is charged with the electric power of the commercial electric power system, and the charging of the backup battery is stopped when the commercial electric power system breaks down.

The power source apparatus of the present embodiment is suitable as a power source of an apparatus for controlling a system to which a power source must be supplied continuously even at the time of electric power breakdown, such as a co-generation system.

Here, in the present embodiment, a power source apparatus of a type such that the commercial electric power system is backed up with a battery has been described; however, the present embodiment can be applied to a combination of a backup battery with another electric power system such as a solar cell in place of the commercial electric power system. The characteristics of the solar cell that often undergoes change in the output voltage by being affected with the weather can be effectively complemented with the backup battery.

What is claimed is:

1. A direct current stabilizing power source apparatus comprising:
    a transformer having first and second primary windings and first and second secondary windings;
    a first self-excitation oscillation type switching means connected to said first primary winding;
    a main electric power supplying circuit that connects a main power source to said first primary winding via said first switching means;
    a second self-excitation oscillation type switching means connected to said second primary winding;
    a backup electric power supplying circuit that connects a backup power source to said second primary winding via said second switching means; and
    a first output circuit that converts an alternating electric current appearing on said first secondary winding into direct electric current for output,
    a second output circuit that outputs an alternating electric current appearing on said second secondary winding to said backup electric power supplying circuit as a power source for charging a battery which is the backup power source,
    wherein said main electric power supplying circuit includes a backup stopping circuit that outputs a signal for stopping an operation of said second switching means when a voltage of a main electric power that is input into the main electric power supplying circuit is larger than or equal to a predetermined value, and the backup stopping circuit is disposed with isolation from the second switching means.

2. The direct current stabilizing power source apparatus according to claim 1, which is provided with a charging controlling circuit that permits output from said second secondary winding connected as the power source for charging the battery while an operation of said second switching means is prohibited.

3. The direct current stabilizing power source apparatus according to claim 1,
    wherein said main power source is a commercial power source, and a power breakdown of the commercial power source is made displayable while said signal that is output from said backup stopping circuit is in an off-state.

* * * * *